3,720,744
PROCESS FOR TREATING ELASTOMERIC FIBERS
Joseph Germano Santangelo, Norristown, N.J., assignor to Celanese Corporation, New York, N.Y.
No Drawing. Continuation of application Ser. No. 786,821, Dec. 16, 1968, which is a continuation of application Ser. No. 381,554, July 9, 1964, both now abandoned. This application Mar. 23, 1971, Ser. No. 127,335
Int. Cl. B29c 25/00; D01f 7/00
U.S. Cl. 264—205       10 Claims

ABSTRACT OF THE DISCLOSURE

An improved spandex type fiber of low permanent set and a method for producing such fibers which method comprises reacting the polymer with a peroxide cross-linking agent and subsequently heat treating a fiber spun from said polymer at a temperature of about 50 to 200 degrees centigrade to effect a cross-linking of the polymer.

---

This is a continuation of Ser. No. 786,821, filed Dec. 16, 1968, now abandoned, which is a continuation of Ser. No. 381,554, filed July 9, 1964, now abandoned.

This invention relates to a process for producing improved elastomeric fibers. More particularly, this invention relates to the preparation of segmented, elastomeric copolymers exhibiting enhanced characteristics of low permanent set.

Synthetic fibers, the so-called "stretch" fibers, have generally received widespread public acceptance. The properties of these fibers, such as elasticity and a desirable "hand" or feel make the stretch fibers highly suitable for the preparation of fibers for apparel and like products. However, these fibers have in the past been characterized by several undesirable features. Thus, for example, some elastomeric fibers, as spun, have shown a high degree of permanent set. A high permanent set, of course, is undesirable in wearing apparel where it is sought to obtain fabrics which will readily conform to the shape of the wearer and which will nevertheless retain a high degree of elasticity.

It is an object of this invention to provide a method for preparing fibers having a low permanent set. It is a further object of this invention to provide a method for producing stretch fibers of segmented, elastomeric copolymers, said fibers similarly being characterized by low permanent set. Other objects and the advantages of this invention will be apparent from the following detailed description and claims.

It should be noted that, although reference is made herein primarily to segmented, elastomeric fibers, my invention is also applicable to elastomeric fibers having high elongation.

In accordance with this invention, a solution or melt of an elastomeric copolymer is extruded into a heated chamber in the form of filaments or fibers which are then contacted in the form of filaments or fibers with a suitable cross-linking agent. The fibers are thereafter heated in order to effect cross-linking thereof, thereby yielding fibers of extremely low permanent set. Although cross-linking will eventually occur at room temperature, it is preferred to apply heat in my procedure in order to accelerate the reaction.

The fibers suitable for treatment in accordance with the process of my invention are preferably segmented, elastomeric copolymers, that is copolymers comprised of two principal types of segments which are chemically connected and which alternate in the polymer chain. One segment, preferably essentially amorphous, may be derived from low melting "soft" polymers, such as an ester polymer, an ether polymer, a hydrocarbon polymer, or the like. Such soft polymers are characterized by relatively weak interchain attractive forces. The other segment is derived from a hard high melting polymer, such as a urea polymer, a urethane polymer, an amide polymer, or the like. In particular, the soft segments of these elastomers are derived from low polymers having a melting point below about 60° C., having a molecular weight of from about 250 to about 5000 and containing terminal radicals possessing active hydrogen atoms. The hard, high melting segments are generally derived from linear polymers having a melting point above about 200° C. in their fiber forming molecular weight range, i.e., above about 5000. The soft segments, as present in the elastomer, appear as radicals of the initial polymer from which the terminal active hydrogens have been removed. Generally, the hard segments comprise from about 10% to about 40% by weight of the segmented copolymer and may be defined as comprising at least one repeating unit of the linear polymer from which they are derived.

The spinning solution contained the elastomeric copolymer may be formulated either with or without a cross-linking agent. In either case, the solution is extruded into a heated cabinet where some degree of cross-linking will occur, if a cross-linking agent has been included in the spinning solution. The extruded fiber is then contacted with a cross-linking agent for a short period of time. The cross-linking solution may be applied to the fiber by any of the liquid-application methods well-known in the art, e.g., by immersion, spraying, lube disc, and the like.

The time of contact between the fiber and the cross-linking solution is not critical to my invention. However, it is usually preferred to employ contact times varying from about 0.25 second to about 15 seconds.

After the fiber has been contacted with the cross-linking agent, it is then exposed to heat. The heat treatment may be effected, e.g., by infrared, hot air oven, liquid bath, high frequency, or like means. The temperatures utilized in this heat treatment step must be sufficient to effect cross-linking. Usually the temperature employed ranges from about 50° C. to about 200° C., although any temperature up to the softening point of the fibers can be utilized.

The temperatures employed will also vary with the length of time the fiber is exposed to heat treatment. The length of time a fiber is subjected to heating, in accordance with this invention, can vary from a few seconds to about 15 minutes. Heating the fibers for periods of longer than 15 minutes does not, in general, provide any significant advantage. Generally, comparable results can be obtained by heat treating the fiber at high temperatures for short periods as can be realized by heating the fiber at lower temperature for a long time, provided, of course, that the temperature is not so high as to degrade the polymer.

In a preferred method of carrying out my invention, the elastomeric fiber, after treatment with the cross-linking agent, is first stretched at least about 150% of its initial length, then relaxed to a length less than the stretched length and finally heated in order fo effect cross-linking thereof. In the stretching step of this embodiment of my invention, a stretch of at least about 150% and usually in the range of from 200% to 500% over the initial length of the fiber, i.e., the length of the fiber in its unstretched state prior to any treatment, is operable to impart desirable characteristics to the fiber when employed in conjunction with the remainder of my process. Preferably, the amount of stretch employed is from about 250% to about 400%. The period of time during which the fiber is maintained in the state of stretch is not critical to the advantageous employment of this process and can vary from periods of less than a second up to periods of several minutes. Normally, the stretching can be conduced at about room temperature.

The relaxing step of this aspect of my process can be conducted at about the same temperature as the stretching step and generally is conducted at about room temperature. The period of time during which the fiber is maintained in the relaxed state is not critical.

The cross-linking agents employed in the process of this invention are preferably peroxide curing agents of the general formula R'—O—O—R, when R and R' are selected from substituted and unsubstituted organic groups including alkyl, aryl, aralkyl, alkaryl, cycloalkyl and such groups containing one or more non-functional groups, such as halogen atoms as substituents. Suitable cross-linking agents include, for example, benzoyl peroxide, lauroyl peroxide, di 2,2-bis (t-butyl) peroxy butane, t-butyl perbenzoate, dicumyl peroxide, ditertiary butyl peroxide, isopropyl peroxide, 2,2-bis (dichlorophenyl) isopropyl peroxide, methyl cumyl peroxide, cymyl cumyl peroxide, t-butyl cumyl peroxide, and 1-isobutoxy-1 cumyl peroxy ethane. The cross-linking agents are usually employed in amounts ranging from about 0.25% to about 20%, by weight, of the elastomeric copolymer being treated. The entire amount of cross-linking agent may be included in the solution used to treat the fiber after the fiber has been extruded or part of the cross-linking agent may be incorporated in the spinning solution. The amount of agent included in the spining solution will be limited by the quantity that can be dissolved therein. Of course, if the practioner finds it expedient, a mixture of any of the cross-linking agents described above may be utilized in this process.

The solvents employed to prepare the spinning solution of the elastomeric fibers to be cross-linked by the process of my invention may be selected from any of those solvents well known to the practitioner to be effective in the spinning of synthetic fibers. Suitable solvents include, e.g., N,N-dimethylformamide, N,N - dimethylacetamide, tetrahydrofuran, dimethylsulfoxide, acetone - N,N - dimethylformamide mixtures, methoxy dimethyl acetamide, hexamethyl phosphoramide, dimethyl nitrosamine, N-methyl pyrrolidone, N-acetyl morpholine, acetone, and methylene chloride-methanol mixtures.

The spinning solution is usually maintained at a temperature above the boiling point of the solvent, but only for short periods.

When cross-linking solutions are used to treat the elastomeric fibers in accordance with my invention, such solutions may be formulated with any solvent which will dissolve the particular cross-linking agent. In addition, it is preferred that such solvents have the ability to effect swelling of the fiber. Suitable solvents include hydrocarbons, e.g. aromatic hydrocarbons such as xylene, benzene and toluene; amides such as lower alkyl amides, e.g., formamide, acetamide, N,N-dimethylformamide and N,N-dimethylacetamide; lower molecular weight alcohols such as methanol, ethanol and isopropanol; chlorinated hydrocarbons such as methylene chloride, chloroform, carbon tetrachloride and ethylene trichloride; and ketones such as acetone. These cross-linking solutions may contain from about 1.0% to about 20% by weight, as based on the weight of the elastomeric copolymer, of the cross-linking agents described previously.

As was mentioned previously, my invention is preferably applied to segmented, elastomeric copolymers. These copolymers may be prepared, for example, by the methods described in U.S. Pats. Nos. 2,625,535; 2,813,776; 2,871,218; 2,953,839; 2,957,852; 2,962,470 and Reissue 24,691.

The polymeric structure of some of these elastomers can be represented by the formula:

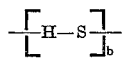

wherein H and S denote the hard and soft segments, respectively; and wherein —H— is further represented by

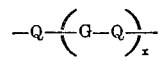

wherein Q is a divalent radical derived by reaction of an organic diisocyanate with active-hydrogen-containing functional groups; G is the residue resulting from the removal of active hydrogen from the terminal functional groups of a low molecular weight bifunctional molecule having a molecular weight less than 500; $x$ is an integer or zero; $b$ is an integer greater than zero; S is the residue resulting from the removal of the active hydrogen from the terminal functional groups of a polymer melting below 60° C., having a molecular weight of from about 250 to about 5,000. Terminal functional groups possessing active hydrogen can be, for example, —OH, —NH$_2$, —SH, —COOH, —CONH$_2$, =NH, —CSNH$_2$, —SO$_2$NH$_2$, and —SO$_2$OH. The hard segment in a repeating unit of a linear polymer may be further defined as having a melting point above about 200° C. in its fiber forming molecular weight range.

Generally, these synthetic elastomers are copolymer formulations based on low molecular weight aliphatic polyesters or polyethers having terminal hydroxyl and/or carboxyl groups which are capable of further reaction with diisocyanates. This latter reaction can be used to couple the lower molecular weight polyester or polyether via urethane links or the diisocyanate can be used in excess so that it becomes a terminal group. In this latter case, the micro-diisocyanates formed can be coupled by means of other reagents such as water, diols, amino alcohols and diamines with the subsequent formation of the high polymer. These elastomeric products are also known as block copolymers.

A variety of organic diisocyanates may be used to prepare the elastomeric copolymers suitable for employment in our invention. Illustrative examples of these diisocyanates are: trimethylene diisocyanate, tetramethylene diisocyanate, pentamethylene diisocyanate, hexamethylene diisocyanate, decamethylene diisocyanate, cyclopentylene-1,3-diisocyanate, 1,4-diisocyanate cyclohexane, p-phenylene diisocyanate, m-phenylene diisocyanate, the tolylene diisocyanates, the naphthalene diisocyanates, 4,4'-diphenyl propane diisocyanate, 4,4'-diphenylmethane diisocyanate.

Illustrative of the types of elastomeric copolymers suitable for employment in our invention are isocyanate modified polyesters such as those described in U.S. Pat. 2,755,266 wherein linear polyesters prepared from polycarboxylic acids and polyhydric alcohols are reacted with an excess of a diisocyanate over the terminal hydroxyl groups of the polyester to form diisocyanate modified polyesters containing terminal isocyanate groups which are then further reacted with a bifunctional cross-linking agent. Polyesterurethane copolymers which are substantially free of cross-links, such as those described in U.S. Pat. 2,871,218 wherein a critical ratio of an essentially linear hydroxyl terminated polyester prepared from a saturated aliphatic glycol having terminal hydroxyl groups and a dicarboxylic acid or its anhydride, and a diphenyl diisocyanate are reacted in the presence of a saturated aliphatic free glycol having terminal hydroxyl groups so that no unreacted isocyanate and hydroxyl groups remain, can also be employed. Broadly, such a copolymer is obtained by reacting one mole of polyester with from 1.1 to 3.1 moles of a diphenyl diisocyanate in the presence of from about 0.1 to 2.1 moles of free glycol. Another type of elastomeric copolymer which can be used in our invention is the type described in U.S. Pat. 2,957,852. An elastomer of this type can be prepared by providing polyether glycol with isocyanate ends by reaction with a diisocyanate. The "capped" prepolymer can then be reacted with a chain-extending agent such as hydrazine which provides a final polymer having repeating units containing hydrazine resins linked through carbonyl groups.

In summary, I have discovered a means for preparing elastomeric fibers which exhibit a high degree of elasticity and low permanent set and which also have satisfactory strength and abrasion characteristics. The fibers produced in accordance with my invention usually possess a tenacity of about 0.7 gram per denier, an elongation of about 600%, and a permanent set of from about 0% to about 10%.

The embodiments of my invention will be further illustrated in the following examples. In each of the examples the permanent set was determined by the same method unless otherwise indicated. Briefly, all samples were conditioned for 24 hours at 65% relative humidity and 23° C. prior to testing. Each sample was then marked while in a taut (not stretched) state so that four marks appear on the fiber, the distance between the outer marks being 5" and the distance between the inner marks being 3". The sample was then clamped between jaws set so that the 5" tested length lay between the jaws. The jaws were then moved about so that the sample was extended until the distances between the inner marks (3" before extension) were:

12.00" for a 300% extension
8.00" for a 200% extension
6.00" for a 100% extension The 300% extension was employed unless otherwise specified. After maintaining the sample in its extended state for two hours, the sample was released and allowed to recover unrestrained for 30 minutes. Then the fiber length between the inner marks was measured after tauting the fiber to rmove any slack in the fiber. The percentage increase (or set) in fiber length is calculated, for example by the following formula:

EXAMPLE I $$\frac{\text{Length after extension} - 3.00''}{3.00''} \times 100 = \text{percent set}$$

(a) A polyesterurethane copolymer of the type described in U.S. Pat. No. 2,871,218 and obtained by reacting hydroxyl terminated poly (tetramethylene adipate), (molecular weight=850; hydroxyl number=130.4; acid number=0.89), butanediol-1,4 and diphenyl methane-p, p'-diisocyanate in a molar ratio of about 1.0; 0.3:1.3, respectively, was employed in this example. A 30% solution of this copolymer in acetone was employed to dry spin an elastomeric fiber from a jet maintained at 75° C. and provided with 20 holes each 0.046 mm. in diameter. The yarn was dried in a 23' downdraft column, the top half having an air temperature of 110° C. and the bottom half having an air temperature of 200° C. The yarn coming from the column was passed over a pair of skewed rolls through a box of talcum powder while being stretched 575%. In the same continuous operation the yarn was then relaxed 80% of its stretched length.

(b) The permanent set of this yarn immediately following a half hour treatment in boiling water was unacceptably high, viz., from 80% to 180%.

(c) Following the treatment of Example I(a), the yarn was immersed for 15 seconds in a 2%, by weight, solution of benzoyl peroxide in acetone, thereafter stretched 500%, relaxed and placed in an oven for 5 minutes at 125° C. The permanent set of the yarn treated by this process was less than 10%.

EXAMPLE II

The polyesterurethane copolymer described in Example I was also employed in this example. A 30% solution of this copolymer in acetone along with 4.5 parts of benzoyl peroxide (per 100 parts of copolymer) was spun from a jet provided with twenty holes each 0.046 mm. in diameter into a dry spinning column containing air at 30° C. in the top half and air at 100° C. in the bottom half. The jet face temperature was 46° C. The yarn coming from the column was passed over a pair of skewed rolls through a box of talcum powder while being stretched 300%. The yarn was then relaxed 71% of its stretch length. The permanent set of this yarn immediately following a one-half hour treatment in boiling water was unacceptably high, viz., from 80% to 100%.

The yarn prepared as described above was immersed for 15 seconds in a 2%, by weight, solution of benzoyl peroxide in acetone, thereafter stretched 500%, relaxed and heat treated for 5 minutes at 125° C. The permanent set of the yarn treated by this process was less than 10%.

EXAMPLE III

The polyesterurethane copolymer described in Example I was also employed in this example. A 30% solution of this copolymer in acetone, along with 4.5 parts of benzoyl peroxide per 100 parts of copolymer was spun from the jet of Example I into a dry spinning column containing air at 100° C. in the top half and air at 200° C. in the bottom half. The jet face temperature was 61° C. The yarn coming from the column was passed over a pair of skewed rolls through a box of talcum powder while being stretched 500%. The yarn was then relaxed 76% of its stretched length. The permanent set of this yarn immediately following a one-half hour treatment in boiling water varied from 20–60%. The yarn prepared as described above was immersed for 15 seconds in a 2%, by weight, solution of benzoyl peroxide in acetone, thereafter stretched 500%, relaxed and heat treated for 5 minutes at 125° C. The permanent set of the yarn treated by this process was less than 10%.

Any departure from the above description which conforms to the present invention is intended to be included within the scope of the invention as defined by the following claims.

What is claimed is:

1. A process for producing an improved elastomeric fiber which comprises contacting a spun segmented elastomeric copolymer fiber with an organic peroxide cross-linking agent and thereafter subjecting said fiber to an elevated temperature of 50 to 200° C. but below the degradation temperature of the polymer thereby yielding a cross-linked fiber of low permanent set, wherein said copolymer is a segmented elastomeric copolymer comprised of a soft polymer segment of a polyester or polyether having a melting point below 60° C., a molecular weight of from about 250 to 5000 and containing terminal active hydrogen atoms which are chemically reacted with a hard diisocyanate polymer segment melting above 200° C. and having a molecular weight above about 5000 through urea, urethane or amide groups.

2. The process of claim 1 wherein the fiber is stretched at least 150% its original length and subsequently relaxed to a length less than the stretched length prior to subjecting the fiber to said elevated temperature.

3. The process of claim 1 wherein said cross-linking agent is applied to said fiber in the form of a solution.

4. The process of claim 1 wherein said cross-linking agent is an organic peroxide represented by the formula R'—O—O—R, where R and R' may be alkyl, aryl, aralkyl, alkaryl, and cycloalkyl.

5. The process of claim 4 wherein the organic peroxide is benzoyl peroxide.

6. The process of claim 1 wherein said cross-linking agent is used in amounts varying from about 0.25% to about 20%, by weight, as based on the weight of the fiber.

7. The process of claim 1 wherein the spun fiber is contacted with a solution containing about 10%, by weight, as based on the weight of the fiber, of benzoyl peroxide and thereafter subjecting the fiber to a temperature of from about 50° C. to about 200° C. for a period of less than 15 minutes, thereby yielding a cross-linked fiber of low permanent set.

8. The process of claim 1 comprising spinning a segmented, elastomeric copolymer comprised of a low melting soft polymer segment of a polyester or polyether having terminal hydrogen atoms which are chemically reacted with a high melting hard diisocyanate polymer segment through urea, urethane or amide groups, contacting the spun copolymer in fiber form with a solution of an organic peroxide, stretching the spun fiber about 150 to 500 percent of its initial length, relaxing the spun fiber and thereafter subjecting the fiber to a temperature of from about 50 to 200° C. for a period of less than 15 minutes, thereby yielding a cross-linked fiber of low permanent set.

9. The process of claim 1 wherein the segmented, elastomeric copolymer is comprised of soft and hard segments alternating in the copolymer chain, and which is represented by the formula:

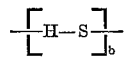

wherein H denotes the hard segment and S denotes the soft segment; and wherein H is further represented by

wherein Q is a divalent radical derived by reaction of an organic diisocyanate with active-hydrogen containing functional groups; G is the residue resulting from the removal of active hydrogen from the terminal functional groups of a low molecular weight bifunctional molecule having a molecular weight less than 500; $x$ is an integer from 0 to 1; $b$ is an integer greater than zero; and wherein S is the residue resulting from the removal of the active hydrogen from the terminal functional groups of a polymer melting below 60° C. having a molecular weight of from 250 to about 5000.

10. The process of claim 3 wherein the cross-linking agent is in a solution of a swelling solvent when applied to the fiber.

References Cited
UNITED STATES PATENTS

| | | | |
|---|---|---|---|
| 2,249,756 | 7/1941 | Finzel | 264—168 |
| 2,933,460 | 4/1960 | Richter et al. | 264—184 |
| 2,957,852 | 10/1960 | Frankenburg et al. | 264—184 |
| 3,154,611 | 10/1964 | Dinberg | 264—176 F |
| 3,198,868 | 8/1965 | Pedretti et al. | 264—347 |
| 3,233,019 | 2/1966 | Adams | 264—78 |
| 3,233,026 | 2/1966 | Richter et al. | 264—178 |
| 3,354,251 | 11/1967 | Thoma et al. | 264—210 Z |
| 3,361,724 | 1/1968 | Watson et al. | 264—184 |
| 3,424,828 | 1/1969 | Harris et al. | 264—346 |
| 3,536,803 | 10/1970 | Epstein et al. | 264—210 Z |

JAY H. WOO, Primary Examiner

U.S. Cl. X.R.

8—115.5; 264—236, 347